United States Patent [19]

Cecil et al.

[11] 4,068,154

[45] Jan. 10, 1978

[54] AUTOMATIC GUIDANCE SYSTEM FOR WELDING TORCHES AND THE LIKE

[75] Inventors: Shelby Cecil, Medina; Abraham Zeewy, University Heights, both of Ohio

[73] Assignee: Cecil Equipment Co., Inc., Medina, Ohio

[21] Appl. No.: 554,667

[22] Filed: Mar. 3, 1975

[51] Int. Cl.² .............................................. G05B 19/42
[52] U.S. Cl. ...................................... 318/568; 318/578; 318/632; 219/124.34
[58] Field of Search ............... 318/568, 632, 578, 576, 318/577; 219/125 PL

[56] References Cited

U.S. PATENT DOCUMENTS

| | | | |
|---|---|---|---|
| 2,717,979 | 9/1955 | Gardiner | 318/578 |
| 3,348,435 | 10/1967 | Lauper | 318/632 X |
| 3,449,540 | 6/1969 | Yanko et al. | 318/568 X |
| 3,467,899 | 9/1969 | Seiuemon et al. | 318/578 |
| 3,727,119 | 4/1973 | Stanley et al. | 318/568 |
| 3,742,200 | 6/1973 | Marley | 318/576 X |
| 3,860,862 | 1/1975 | Dell et al. | 318/568 |
| 3,916,571 | 11/1975 | Seidel | 318/578 X |

*Primary Examiner*—B. Dobeck

*Attorney, Agent, or Firm*—Cain and Henn

[57] ABSTRACT

Apparatus for guiding a welding torch, slave mechanism or the like, including a probe or guide wherein the torch follows or traces the path of the probe, both as the probe (1) follows a basic straight, curved, or otherwise changing spatial or three dimensional path and (2) as it departs from the direction of the basic path or seam because of defects of rather short duration, or of sudden changes in lateral and/or vertical abutments or surfaces against which the probe travels, wherein the path of the welding torch or slave mechanism is caused to trace the path traveled by the probe or guide, and not merely to duplicate the path in a stepwise functional relationship therewith. The apparatus includes means by which the probe directs its own travel along a predetermined path, whether planar or spatial, and detects deviations therein; it further includes memory means by which the signals of the probe and the deviations therein are retained within the apparatus, and utilized to cause the slave to trace the path of the probe or guide. The invention includes the circuitry and the portions thereof by which the objects of the invention are obtained and the apparatus is caused to function, as well as the apparatus itself.

9 Claims, 3 Drawing Figures

AUTOMATIC GUIDANCE SYSTEM FOR WELDING TORCHES AND THE LIKE

BACKGROUND OF THE INVENTION

1. Field of the Invention

This invention relates to new and improved apparatus for guiding welding torches, slaves and the like, and the new and improved electronic circuitry by which a probe or guide controls its own travel, and in turn controls and causes the travel of a welding torch, slave, and the like subsequently to trace the travel of the guide or probe, whether on a two or three-dimensional path, and including vertical and horizontal variations therein.

2. Description of the Prior Art

Automatic welding apparatus is well known; in addition, guiding systems wherein a guide or probe provides an electrical signal for actuating a welding torch to move the torch in a predetermined direction in a predetermined space for as long as the signal is sent, substantially simultaneously with the signal and the movement or deviations of the guide or probe, are well known in the art.

In such systems, the probe, carried upon horizontal and vertical cross-slides or other positioning apparatus, is biased against predetermined vertical and/or horizontal surfaces, and responds to deviations in the surfaces in order to close circuits and originate signals which cause drive means to move the welding torch, carried upon similar positioning apparatus, a distance corresponding to the change in path of the probe caused by the deviation. Thus, the welding torch substantially duplicates the path of the probe so as to lay down a welding bead which follows the surfaces against which the probe is biased. However, the path of the torch is generally spaced from the deviation either (1) by the lineal distance between the probe and the torch, i.e., by the distance the probe and torch are separated from each other with respect to the basic direction of travel of the entire apparatus, or (2) by a distance dependent upon the effect of the time lag in initiating torch movement due to the inertia of the system. To this latter condition, there is added a further effect of the distance between the probe and guide, whether mounted on its own slide carried on the torch, or mounted on a separate cross-slide. This lack of one-to-one correspondence with the guide path means that deviations are often corrected for by the torch either before or after they are reached during the travel of the torch, and when reached, are ignored; therefore, the bead does not in fact follow the surface traced by the probe, and so fails to make the desired perfect weld.

SUMMARY OF THE INVENTION

The present invention is the apparatus which comprised an automatic welding torch which is responsive to a preceding guide or probe programmed to follow a welding seam. The guide is mounted on sensors connected to positioning motors; on encountering deviations in the path of travel, the guide is adjusted to remain on the path by feedback circuits which operate to energize the positioning motors the correct amount and direction. The amount and direction signals are stored, and used again to position the welding-torch head when the head is in the same spatial position as was the probe or guide when the original signals were sent.

It is, therefore, a general object of this invention to provide a new and improved guiding system for welding apparatus and the like.

Another object of this invention is to provide a new and improved guiding system or apparatus in which a guide, probe, or other sensor provides a signal in response to a deviation in the path of its travel, and a torch, slave, or the like responds to the signal to traverse the deviation or change in path at the subsequent time when the torch moves over the same point of deviation in path, even though the rate of travel is nonuniform.

Another object of this invention is to provide a new and improved electrical circuit and parts thereof by which a torch, slave device, or the like tracks along the path of a guide, probe, or master.

Still another object of this invention is to provide a new and improved logic circuit for determining whether a signal should be fed into a circuit to cause a subsequent movement of torch, slave and the like, or should be deviated; and to provide such a circuit which integrates deviations in the path of a guide or probe before transmitting the same to a circuit to control the torch, slave or the like.

Still other objects of this invention include the provision of a new and improved apparatus for guiding a welding torch, slave mechanism and the like, in response to the movement like traces the path of the guide or probe spatially or physically, but not simultaneously; which is efficient and effective in operation; which does not require any modification of the welding head, torch or related apparatus; which can be used with guides or probes currently available commercially without requiring modification thereof; which is effective whether the basic path be rectilinear or arcuate; which is effective even though the distance between the probe or guide and torch or slave varies; which corrects for deviations in the path which are spatial and/or planar; which corrects for spatial or three-dimensional changes in the path of the probe by vectoring the change as a function of vertical and horizontal travel; which utilizes a probe or guide first to control its own path and then to control the path of a torch, slave or the like to follow precisely the path of the probe or guide; and which includes means for manually controlling the probe or guide and/or the torch, slave and the like.

It is an object of this invention to achieve one or more of the foregoing objects. These and other objects, features, and advantages of this invention will appear from the following description of a preferred form therof, reference being had to the accompanying drawings.

BRIEF DESCRIPTION OF THE DRAWINGS

The invention is described in the accompanying drawings, wherein.

DESCRIPTION OF THE PREFERRED EMBODIMENTS

Figure 1:
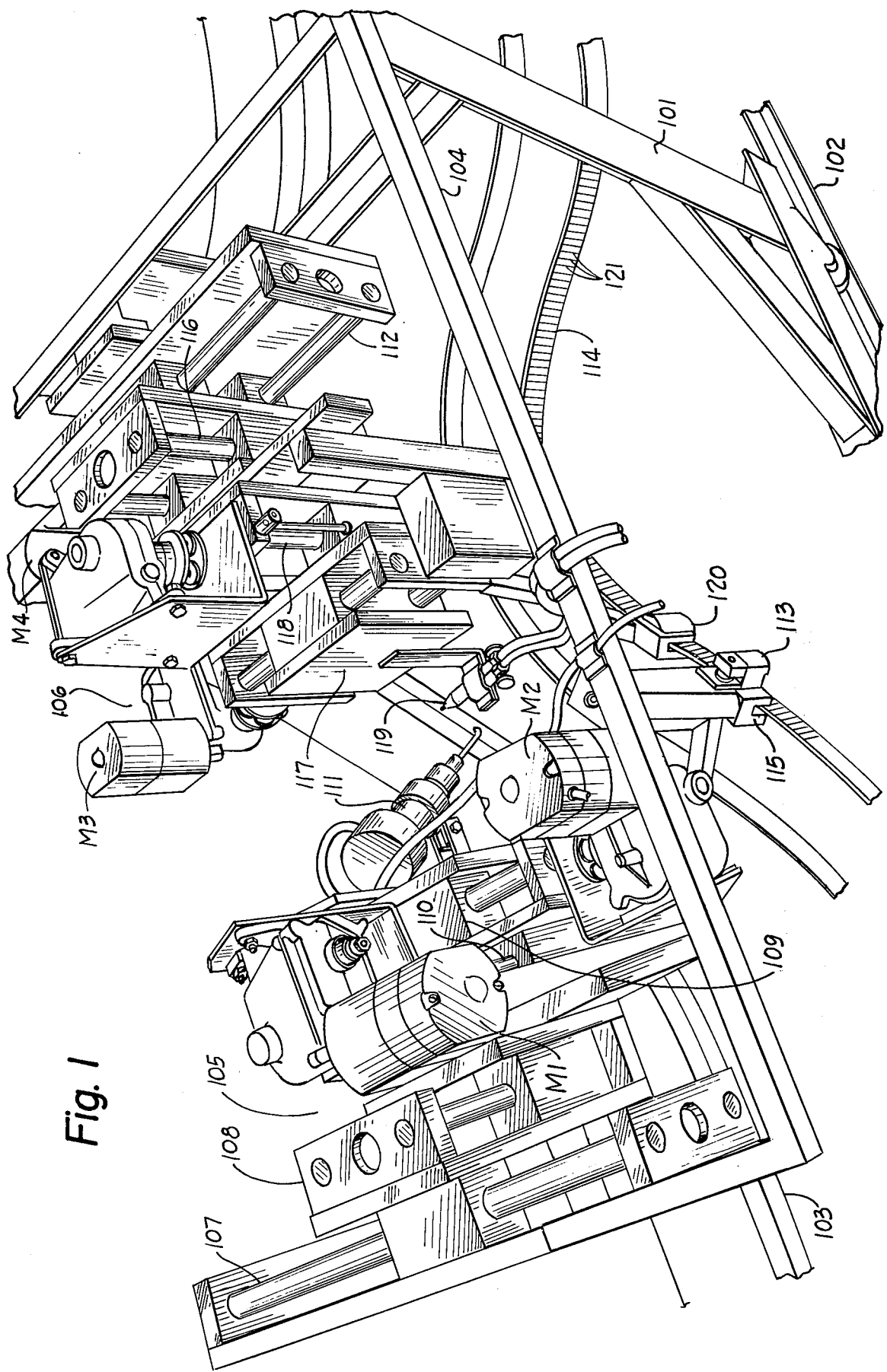
FIG. 1 is a view in perspective of one embodiment of the present invention, showing the apparatus mounted on straight rails, welding a complex curve.

A preferred embodiment of the system, in accordance with the invention, is shown in FIG. 1. Therein, the entire apparatus is moved by a trolley or cart 101 along rails 102 over which are disposed the pieces 103 to be welded and a form for rough positioning, described below. In this instance, the apparatus is used to weld together upper and lower curved channels to form a curved box-beam. The form 114 or configuration generally correspondent to the final configuration of the curved box-beam is disposed parallel to the pieces to be welded. The cart of trolley 101 is moved along the length of the box-beam over tracks or the like by any convenient moving means, not shown, such as e.g., and internal motor, cables or the like.

A support frame 104 is mounted onto the cart or trolley, upon which the detecting, following, positioning, and welding apparatuses are carried. In general, the carried apparatus includes a detecting probe-carrying assembly 105 and welding head or torch-carrying assembly 106. The detecting probe-carrying assembly 105 includes a first set of positioning cross-slides including a horizontal cross-slide 107 and a vertical cross-slide 108 which are free to move; the center driving screw shaft, for example, has been removed. Carried upon the vertical free-moving cross-slide 108 is a second set of horizontal 109 and vertical 110 cross-slides, the positions of which may be controlled by electric motors M2 and M1, respectively. The probe 111 may be mounted onto the face of the horizontal motor-driven cross-slide 109.

For moving the probe to the approximate desired vicinity of the seam or path to be detected, upon which the welding is to be performed, a brace 113 or the like may be attached to the free-moving horizontal and vertical cross-slides 107 and 108. The brace may then ride upon the track of the parallel form 114 of the pieces 103 to be welded, and may include an appropriate connecting or riding device or travel guide 115 for tracking the particular shape of the parallel form or of the piece to be welded. For example, as illustrated, the parallel form 114 may be a generally U-shaped channel generally corresponding to the lower channel which will utlimately form the curved box-beam. The travel guide may be rotatably mounted by a pin or rod (not shown) to one of the positioning braces attached to the free-moving horizontal and vertical cross-slides 107 and 108. The travel guide may optionally include, within a slot overfitting one of the upstanding walls of the channel of the parallel form, one or more wheels, to reduce the friction of the travel guide upon the parallel form as it is traveled thereover.

Thus, as the frame 104 is moved along the track on rail 102 along the length of the parallel form 114 and pieces to be welded 103, the travel guide 115 detects the horizontal and vertical displacement of the parallel form 114 to tranmit them through the free-sliding horizontal and vertical cross-slides 107 and 108 to roughly position the probe 111 near the seam, as a first approximation to the configuration to be followed.

The mirror image of the probe-positioning apparatus is used for roughly positioning the welding torch. A set of free-moving horizontal 112 and vertical 116 cross-slides are mounted onto the end of the frame opposite the cross-slides 107 and 108 of the probe assembly. Carried upon the free-moving vertical cross-slide 116 for the welding assembly is a set of motor-driven horizontal 117 and vertical 118 cross-slides, positioned by motors M3 and M4, respectivly, which move a screw drive or the like to finely and accurately position the cross-slides 117 and 118. Mounted upon the horizontal motor-driven cross-slide is the welding-torch head 119 to be disposed, for instance, an inch or more behind the probe, with respect to the direction of horizontal travel of the assembly.

Connecting the free-moving horizontal 112 and vertical 116 cross-slides is a second brace member 120 having a travel guide rotatably mounted upon the end adjacent the parallel form, like the guide 115 above described with respect to the probe assembly. The travel guide of the torch of the welding-head-positioning apparatus should trail the travel guide of the probe-position apparatus by the same distance the torch or welding head 119 trails the probe 111 upon the seam to effect the same rough or approximate positions for the probe and torch or welding head as they are successivley passed by the same point on the seam.

The operation of the welding-head-positioning assembly is the same as the operation of the probe assembly, except that movements of the welding-head-positioning assembly are delayed from movements of the probe-positioning assembly by the quotient of the distance between the assemblies and the horizontal speed of the cart or trolley.

The speed of the probe and welding head with respect to the horizontal speed of the cart or trolley or with the speed of each other may vary. Therefore, it is essential to the operation of the present invention that the torch follow the probe only in a spatial relationship, irrespective of the rate of travel of the apparatus. Thus, the apparatus operates with equal facility on thin or heavy work with differing heat capacity and weld rate.

To accurately position the welding torch along the seam to be effected, a signal is first derived from the probe as it is moved along the seam, to indicate any changes in direction of the seam. The probe may conveniently be of the type having a detecting or feeler rod substantially coaxially disposed within a carrying frame, having therein a plurality of contacts which complete electrical circuits when the feeler rod comes into electrical and mechanical contact therewith. Thus, for example, as a horizontal force, which may be encountered by the actual channel's movement to the left with respect to the direction of travel of the cart or trolley, is applied to the feeler, the feeler rod is caused to rotate or pivot within the carrying frame to contact an appropriate sensor means within the carrying frame. Alternatively, a probe as described and illustrated in copending patent application entitled PROPORTIONAL CONTROL FOR GUIDANCE SYSTEM, Ser. No. 318,493, filed Dec. 26, 1972 and assigned to the same assignee as the present invention, may be used which utilizes continuous variable resistors varied by probe movements to reflect instantanious changes in the channel or seam direction. The use of such probe will generally require an appropriate analog-digital converter, although other signal-storage means can be used.

Because the welding apparatus follows the probe assembly, the welding apparatus does not traverse the same points as the probe until a later time, depending upon the distance of separation and the speed of the cart, as mentioned above. Thus, the signals generated by the probe in response to the changes of the path of the channel must necessarily be delayed to be applied to the fine, motor-driven positioning apparatus for the welding apparatus (the general position changes being made by the travel guide, parallel form, and free-moving cross-slides, as above discussed), to prevent the weld from being applied at the wrong point on the channel or even off the channel entirely.

To effect proper fine positioning of the welding apparatus in response to the above signals, a shift-pulse generator is provided for timing the process of the position-correction signals between the probe and the welding apparatus through the shift register. One method for detecting the horizontal speed may be, as illustrated in FIG. 1, a plurality of stripes 121 or the like upon the parallel form 114, the existence of each stripe being detected by a photoelectric cell which may be carried, for example, on the travel guide 115 or 120. Thus, the correction signals generated by the probe 111 may be stored in the horizontal shift-register unit, described below, and advanced through it as the guide passes the successive stripes. In this manner, the same correcton signals will be transmitted with a delay to the positioning motors M3 and M4 of the torch as the system advances, and the torch will be positioned in exactly the same way as the probe, and in the same location. Identical stripes, photoelectric cell pulse generator and shift register are used to transmit corrections in the vertical direction. It will be appreciated, of course, that the positioning motors of the probe assembly are rapidly adjusted in response to the probe signals to maintain the proper probe position with respect to the channel to be welded. As the welding apparatus reaches the same position, that signal will be applied to the positioning motors of the welding apparatus after being shifted through the corresponding shift register to move it an amount and directon equal to that commanded by the probe.

Figure 2:
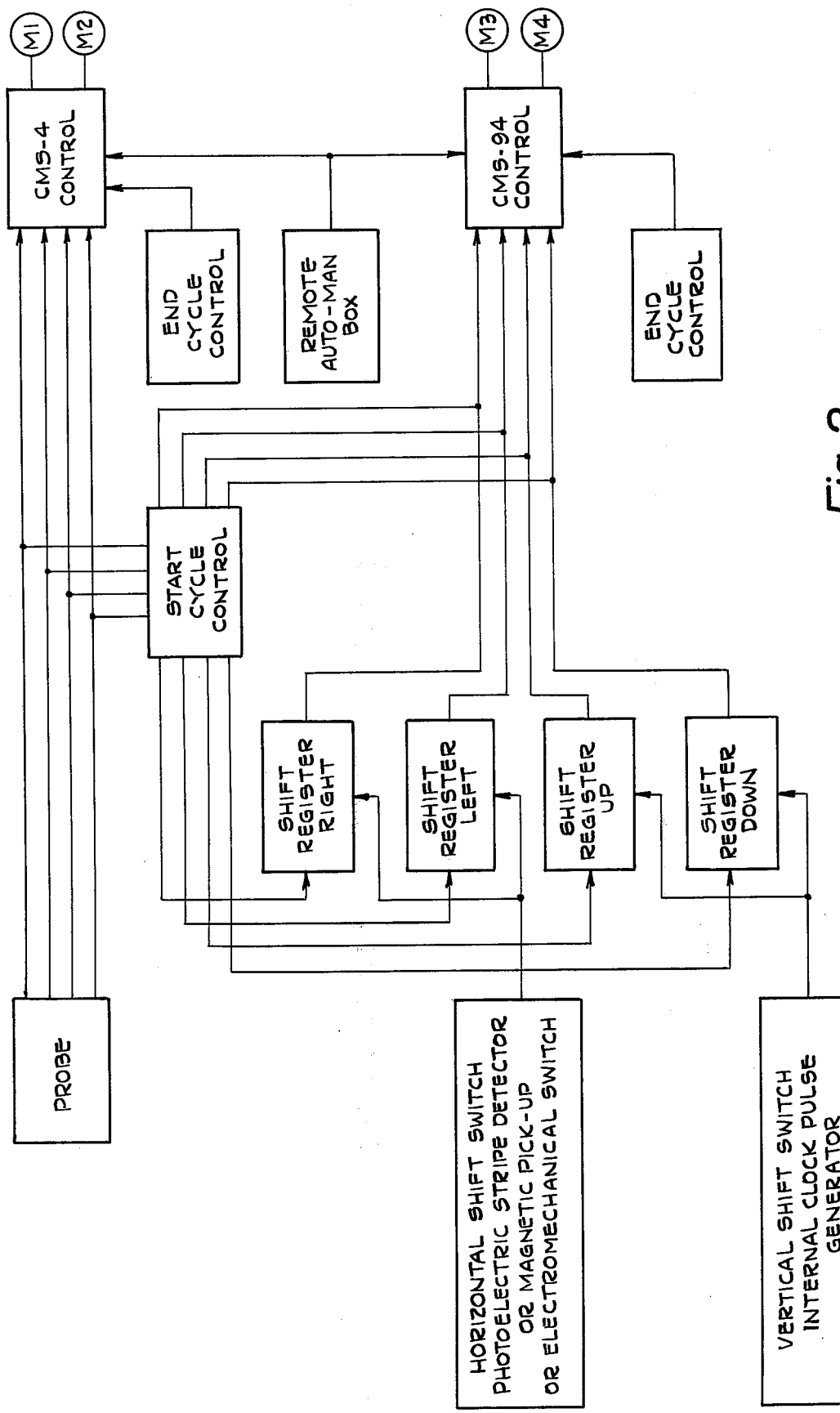
FIG. 2 is a box diagram illustrating an electric circuit for controlling the torch of slave unit, based upon input from the master probe.

The overall operation of the system, illustrated in box-diagram form in FIG. 2, shows the probe and the shift registers (one per direction) having, for example, the number of steps therein corresponding to the number of steps of delay between the probe and welding apparatus. The output of any shift register is taken upon completion of proper shift time by torch-positioning control motors to correct the spatial position of the torch, with respect to the seam.

Figure 3:
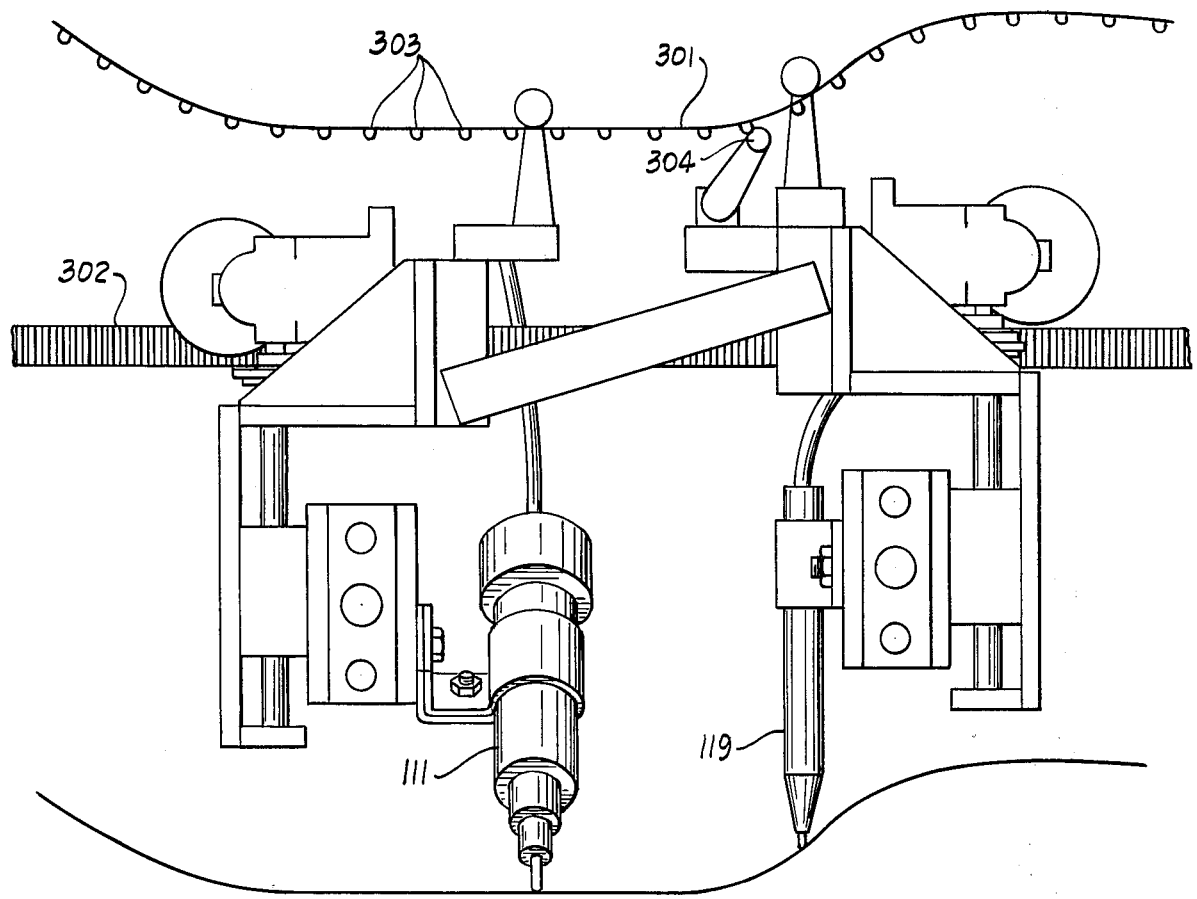
FIG. 3 is an elevation of the apparatus, showing the functions of the probe and the slave torch-carrying unit in two dimensions. In this view, an auxiliary guidance means is depicted in the overhead rail, which provides vectoring for gross movement.

In accordance with this invention, an alternative embodiment of apparatus utilizing the principles of the invention is illustrated in elevation in FIG. 3. Therein, an assembly incorporating a probe 111 or other sensor behind which the welding apparatus 119 is carried is illustrated. Each assembly is independently carried upon a motor-driven vertical and horizontal positioning cross-slides 109, 110, 117 and 118 described in detail above with reference to FIG. 1. The free-moving positioning cross-slides, however, may be omitted, since the probe and welding assemblies, mounted upon their respective positioning cross-slides, may be suspended from an overhanding track or rail 301 having the same general vertical configuration as the pieces upon which a weld is to be effected to roughly position the suspended apparatus. For example, as illustrated, the piece of material 103 upon which the weld is to be made may have a tortuous or circuitous route, the same general outline presented being reflected in the overhanging vertical track, thereby obviating the need for the free-moving positioning cross-slides.

The apparatuses may be moved horizontally upon a second track 302, for example, having a gear rack thereon to receive a driving gear by which the appara-tuses may be moved. The horizontal track 302 may, like the overhanging vertical track 301, follow a tortuous or circuitous path generally reflecting the horizontal path over which the apparatuses are to be traversed.

To determine accurately the horizontal location of the probe and torch apparatuses, equally-spaced protrusions 303 may be provided upon, for example, the track or rail 301 from which the apparatuses are suspended. A detecting wheel 304 or the like rotatably mounted upon a switch or other detecting electronic-condition generator rides upon the track 301 to mechanically detect the protrusions to actuate the appropriate positioning motors.

Because the distance between the probe and torch remains constant in this particular embodiment, only one horizontal speed detector need be employed if a high degree of accuracy is not required.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

What is claimed is:

1. A system for guiding a slave over the length of a predetermined path, comprising means for detecting spatial elevations and changes thereof in the predetermined path, said spatial elevations and changes thereof having digital values defining the same, means for moving said detecting means and slave independently over the length of the path, means for recording the digital values of the instantaneous magnitude and direction of the spatial elevations and changes thereof detected by said detecting means as it is moved over the length of the path, and means for positioning the slave in accordance with the recorded spatial elevations and changes thereof as it is subsequently moved over the length of the path.

2. The system of claim 1 further comprising a first set of motor-driven positioning cross-slides upon which the slave is carried.

3. The system of claim 2 further comprising a first set of motor-driven positioning cross-slides upon which the detecting means in carried, movable in response to signals from said detecting means.

4. The system of claim 3 wherein said recording means is a plurality of digital shift registers, one for each direction of movement of the slave and said detecting means.

5. The system of claim 4 further comprising means for generating pulses corresponding to velocity along the length of said path, and means for generating a digital electrical signal corresponding to the spatial elevation and changes thereof detected by said detecting means at each pulse, said signal being recorded within said plurality of digital shift registers.

6. A system for guiding a slave over the length of a predetermined path, comprising means for detecting spatial elevations and changes thereof in the predetermined path, said spatial elevations and changes thereof having digital values defining the same, means for moving said detecting means and the slave independently over the length of the path, means for recording the digital values of the instantaneous magnitude and direction of the spatial elevations and changes thereof detected by said detecting means as it is moved over the length of the path, means for positioning the slave in accordance with the recorded spatial elevations and changes thereof as it is subsequently moved over the length of the path, a first set of motor-driven positioning cross-slides movable in response to signals from said detecting means upon which the slave is carried, said recording means is a plurality of digital shift registers, one for each direction of movement of the slave and said detecting means, means for generating pulses corresponding to velocity along the length of said path, and means for generating a digital electrical signal corresponding to the spatial elevation and changes thereof detected by said detecting means at each pulse, said signal being recorded within said plurality of digital shift registers, a tract substantially parallel to the predetermined path, and means connecting the slave and said detecting means riding upon said track for independently positioning the slave and said detecting means in the approximate vicinity of said path, as the slave and said detecting means are moved along the length of the path.

7. The system of claim 6 further comprising two sets of second positioning cross-slides, one carrying said first set of slave-carrying cross-slides, and the other carrying said first set of detecting-means-carrying cross-slides, said means for positioning the slave and said detecting means in the approximate vicinity of said path being in attachment with said second sets of positioning cross-slides to independently position the slave and said detecting means.

8. The system of claim 6 wherein said means for generating pulses corresponding to positions along the length of the path comprises a plurality of equally spaced stripes along said track and two photoelectric means, one on each of said connecting means to detect said stripes for generating an electrical output pulse upon detection.

9. The system of claim 6 wherein said means for generating pulses corresponding to positions along the length of the path comprises a rack along said track having protrusions thereupon, and at least one switch carried by one of said connecting means, operated by the protrusions on said rack.

* * * * *